United States Patent
Alexandrov et al.

[11] 3,910,523
[45] Oct. 7, 1975

[54] ARRANGEMENT FOR PNEUMATIC PIPING OF CARGOES IN CONTAINERS

[76] Inventors: Adolf Moritsovich Alexandrov, Federativny prospekt, 6, korpus 3, kv. 8; Jury Abramovich Isimbler, Sojuzny prospekt, 10, kv. 261; Vladimir Efimovich Aglitsky, Zatsepsky val, 6/13, kv. 61; Jury Arnoldovich Topolyansky, Matveevskaya ulitsa, 10, korpus, 4, kv. 233; Sergei Mikhailovich Susekov, shosse Entuziastov, 208. Korpus 4. kv. 442, all of, Moscow; Dmitry Rudolfovich Gun, Komosomolskaya Ulitsa, 7, Kv. 29, Ljubertsy Moskovskoi oblasti; Dmitry Evgenievich Geints, Flotskaya ulitsa, 16, kv. 116, Moscow, all of U.S.S.R.

[22] Filed: Feb. 28, 1974

[21] Appl. No.: 447,047

[30]  Foreign Application Priority Data
May 30, 1973  U.S.S.R............................ 1926413

[52] U.S. Cl. .......................... 243/6; 243/3; 243/36
[51] Int. Cl.² ......................................... B65G 51/08
[58] Field of Search .............. 243/1, 2, 6, 7, 8, 9, 3, 243/4, 36, 38; 104/155, 156; 302/1, 2

[56] References Cited
UNITED STATES PATENTS

| 623,509 | 4/1899 | Bostedo | 243/6 |
|---|---|---|---|
| 1,753,987 | 4/1930 | Hohne | 243/6 X |
| 3,148,845 | 9/1964 | Buchwald et al. | 243/6 X |
| 3,438,337 | 4/1969 | Edwards | 243/1 |

*Primary Examiner*—Evon C. Blunk
*Assistant Examiner*—James L. Rowland
*Attorney, Agent, or Firm*—Waters, Schwartz & Nissen

[57]  ABSTRACT

An arrangement wherein provided in a pipeline connecting loading and unloading terminals and communicating with the main source of a compressed gas flow are two sluice gates spaced somewhat apart as well as branch pipes with valves for gas discharge. Each of said branch pipes is arranged upstream of a corresponding sluice gate and close to it in the direction of containers travel. Connected behind and close to either of the gates in the direction of the containers travel are branch pipes with valves, communicating the pipeline with an intermediate compressed gas source. The gas discharge branch pipe arranged in a pipeline portion upstream of the other sluice gate is connected by its opposite end to a branch pipe communicating said portion with an intermediate compressed gas flow source upstream of its valve, as a result of which the container travels through said portion continuously.

2 Claims, 2 Drawing Figures

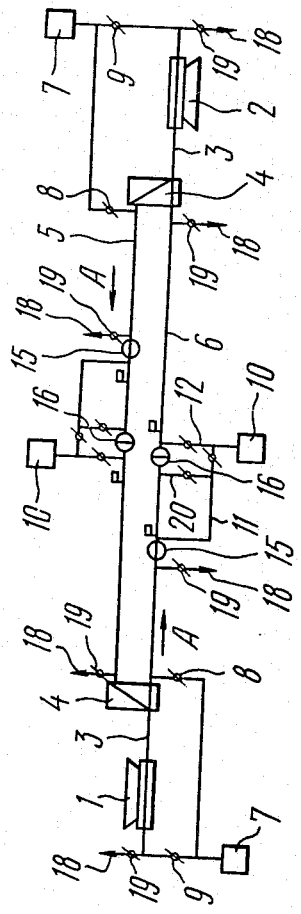
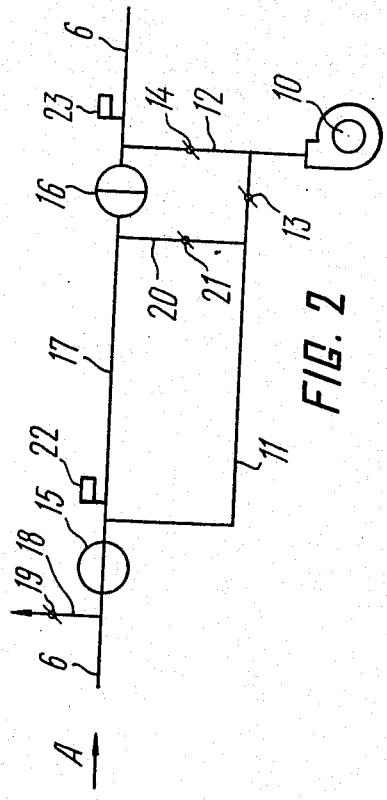

ARRANGEMENT FOR PNEUMATIC PIPING OF CARGOES IN CONTAINERS

The present invention relates to arrangements for pneumatic piping of cargoes through a pipeline and more particularly to arrangements for pneumatic piping of cargoes in containers or in stocks of containers through pipelines.

It is most advantageous to utilize an arrangement made according to the present invention for piping a multitude of containers or stocks thereof through pipes of a large (close to or exeeding one meter) diameter, at a time.

Commonly known are arrangements for the pneumatic haulage through pipelines of cargoes in containers or in stocks thereof, including loading-unloading terminals communicating one to another by means of said pipelines.

Such a pipeline for conveying said containers has connection with the main (master) and intermediate (booster) sources of a compressed gas flow, with ventilators, air blowers, superchargers, compressors and other facilities that suit for the purpose being used in such a capacity. The main sources are arranged behind loading and unloading terminals, while the intermediate ones are spaced at preset intervals throughout the course. The number of intermediate compressed gas flow sources depends on their parameters (pressure, flow rate), pipe capacity, relief of the ground and length of the course.

At the place where an intermediate source is connected to the pipeline, there are two sluice gates on the latter spaced one from the other at a distance exceeding the length of a container or that of a stock of containers. From said intermediate source, compressed gas is forced to the pipeline through two branch pipes fitted with valves. One of said valves is connected to a pipeline portion limited by sluice gates, whereas the other is connected to a branch pipe available downstream of the other sluice gate in the direction of the containers travel. The two sluice gates and the pipeline portion limited in-between form a sluice chamber. Provided upstream of either of the sluice gates in the direction of the containers travel are pipe branches connected to said pipeline, fitted with valves for gas discharge and communicating with the atmosphere.

A disadvantage of the arrangement described hereinabove is that a stock of containers, when in the sluice chamber, discontinues its movement for the time necessary for the change-over of the sluice gates and the valve on a gas discharge branch pipe provided on the pipeline portion limited by said sluice gates. During the valve change-over, said branch pipe is disconnected from the atmosphere, i.e., the possibility is precluded of a pressure discharge into the atmosphere from the pipeline arranged downstream of the other sluice gate in the direction of the containers travel, when said sluice gate is changed over from closed to open.

Another disadvantage of the communication of the branch pipe arranged in a pipeline portion limited by the sluice gates with the atmosphere is that a flaw (incomplete opening of said gate) in the sluice gate provided downstream of said branch pipe may cause trouble, i.e., an impact of the container against the gate.

An object of the present invention is to provide an arrangement for the pneumatic piping of cargoes in containers, wherein a gas discharge branch pipe is so connected to a pipeline portion between sluice gates as to ensure uninterrupted passage of a container through that portion in the course of the arrangement operation and its stopping in case of a flaw in the sluice gate.

According to the specified object of the invention, an arrangement is proposed for the pneumatic piping of cargoes in containers, wherein provided in a pipeline connecting loading-unloading terminals and communicating with the main source of a compressed gas flow is at least one portion between two sluice gates spaced at some interval one from the other so that there is a branch pipe with a gas discharge valve, arranged upstream of and close to either of the sluice gates on the pipeline in the direction of containers travel and that there is a branch pipe with a valve, arranged downstream of and close to either of said sluice gates and communicating the pipeline with an intermediate compressed gas flow source, the gas discharge branch pipe connected to said portion of the pipeline between the sluice gates being joined, by its opposite end, to the branch pipe communicating this portion with an intermediate compressed gas flow source and arranged upstream of its valve in the direction of the containers travel, as a result of which a container passes through said portion between the sluice gates continuously.

It is practicable that the gas discharge branch pipe be connected to said pipeline portion in the direction of the containers travel at a distance from the first sluice gate, that exceeds the length of the free path of the container.

Such spacing of the gas discharge branch pipe helps achieve the complete stopping of the container moving by inertia close to the sluice gate in case of its fault.

The arrangement for the pneumatic piping of cargoes in containers, realized according to the present invention, permits uninterrupted travel of containers or a stock thereof through a sluice chamber in the course of the arrangement operation, which helps, in its turn, increase its efficiency.

Furthermore, such connection of the gas discharge branch pipe permits the stopping of containers or stocks thereof in case of a faulty operation of the sluice gate.

Other objects and advantages of the arrangement for the pneumatic piping of cargoes in containers will be more apparent from the following description of an exemplary embodiment of the present invention, reference being had to appended drawings, wherein:

FIG. 1 shows an arrangement for the pneumatic piping of cargoes in containers, according to the invention, general view; and FIG. 2 shows a sluice chamber and its connection to an intermediate compressed air flow source, enlarged scale.

An arrangement for the pneumatic piping of cargoes in containers (not shown) comprises a loading terminal 1 (FIG. 1) and an unloading terminal 2. Through pipelines 3 and switches 4, the terminals are connected to pipelines 5 and 6 through which containers (not shown) are piped in one direction. Arranged close to the loading terminal 1 and unloading terminal 2 are the main sources 7 of compressed air flows in the pipelines 3, 5 and 6. Used as said compressed air flow sources 7 are ventilators, blowers, compressors, superchargers and other devices that suit the purpose. Said sources 7 are connected to the pipelines 5 and 6 via valves 8 and to the loading 1 and unloading 2 terminals via valves 9.

As the pipelines 5 and 6 are too long for the air pressure from the source 7 to move containers at a preset speed throughout their length, provision is made for the connection to said source of intermediate (booster) compressed air flow sources 10. The number of said intermediate (booster) sources 10 is calculated to depend on the efficiency and length of a pipeline, ground relief, selected types of air flow sources, and other factors.

As the pipelines 5 and 6 are identical, furtheron everything true of one of them is valid for the other.

The intermediate source 10 is connected to the pipeline 6 in two points by means of branch pipes 11 (FIGS. 1 and 2) and 12 having valves 13 and 14 respectively.

The pipeline 6 has two sluice gates 15 and 16 spaced one from the other to an interval depending on the length of a container or a stock of containers and its (their) stopping distance. The sluice gates 15 and 16 as well as a portion 17 of the pipeline 6, limited by said gates 15 and 16, form a sluice chamber.

The branch pipe 11 is connected to the portion 17 of the pipeline 6 close to the sluice gate 15 and downstream of it in the direction of the containers travel shown by pointer A.

The branch pipe 12 is connected to the pipeline 6 directly downstream of the sluice gate 16 in the direction of the containers travel.

For air discharge, there are branch pipes 18 together with valves 19 installed on said pipelines 3, 5 and 6. These branch pipes communicate with the atmosphere.

For removing air from the portion 17 of the pipeline 6 in the course of the container's travel therein, there is a branch pipe 20 with a valve 21, connected by one of its ends to said portion and by its other end to the branch pipe 11 communicating the source 10 with the portion 17. The branch pipe 20 is connected to the pipeline 6 on its portion 17 close to the sluice gate 16 and upstream of it in the direction of the container's travel and is also connected to the branch pipe 11 upsteam of the valve 13 in the direction of the container's travel. Thus, the branch pipe 20 forms a strip between the branch pipe 11 and the portion 17 of the pipeline.

The installation for the pneumatic piping of cargoes in containers operates as follows.

From the loading 1 and unloading 2 terminals, containers are fed, via the switches 4 and under the action of the air flow forced from the sources 7, to the pipelines 5 and 6 from the pipelines 3 and travel thereon to the nearest sluice chamber.

The travel of containers in the pipelines 5 and 6 on the portions preceeding the sluice chambers is possible due to the drop of the air pressure created by the source 7 and released into the atmosphere through the opened valves 19 of the branch pipes 18 provided upstream of sluice chambers. The travel of containers from the sluice chambers and beyond them is possible due to the drop in the air pressure created by the sources 10 and released into the atmosphere through the opened valves 19 of the branch pipes 18 provided immediately upstream of successive intermediate sources (not shown) or upstream of loading-unloading terminals 1 and 2 in the direction of the containers travel. A container or a stock of containers passing through the sluice chamber, the valves 14, 21 and 19 as well as the gate 15 are opened and the valve 13 and the gate 16 are closed.

As soon as the container has passed the gate 15, a signal from a containers position pickup mounted, downstream of the gate 15, on the portion 17 of the pipeline 6 at a distance equal to the length of the container or of the stock triggers automatic closure of the gate 15 and resultant opening of the gate 13.

Due to the provision of a strip 20, if the valve 21 is opened, the pressure behind the container and ahead of it on the portion 17 of the pipeline remains equal yet varying after the opening of the valve 13. Therefore, the travel of the stock on the portion 17 of the pipeline 6 within the limits of the sluice chamber proceeds by inertia. After the opening of the valve 13, the gate 16 starts opening automatically, as a result of which there are no variations in the sluice chamber pressure. The gate 16 opening completely, the valves 21 and 14 become closed and the container picking up the speed due to the pressure difference passes by the gate 16. On signal from a container position pickup 23 arranged on the pipeline 6 downstream of the gate 16 at a distance equal to the length of the container or the stock, there begins a preparation of the sluice chamber for the reception of a successive container in keeping with a preset program. This involves the opening of the valve 14 and simultaneous closing of the valve 13 and gate 16 and subsequent opening of the gate 15 and valve 21.

If the opening operation cannot be completed in the course of the opening of the gate 16 because of its fault, the container moving by inertia in the portion 17 of the pipeline comes to a stand having not reached said gate 16 since the length of the portion 17 is selected such as to guarantee the stopping of the container therein.

As the time required for the operation of all the valves and gates is substantially less than the time of the free (by inertia) path of the container or the stock within the portion 17 of the pipeline, the container is not able to stop in normal operating conditions but somewhat reduces its speed.

Thus, the efficiency of the arrangement for the pneumatic piping of cargoes through pipelines can be raised thanks to the continuous passing of the sluice chambers by containers without any capital investments involved.

What we claim is:

1. An arrangement for the pneumatic piping of cargoes in containers, comprising: loading-unloading terminals; pipeline connecting said loading-unloading terminals; main source of a compressed gas flow in said pipeline; intermediate source of a compressed gas flow; first and second sluice gates provided at some distance one from the other in said pipeline; a pipeline portion limited by said sluice gates; a first branch pipe having a valve therein and communicating said intermediate compressed gas flow source with said pipeline portion and being connected thereto proximate to said first sluice gate; a second branch pipe having a valve therein and communicating said pipeline with said intermediate gas flow source and being connected to said pipeline downstream of the second sluice gate and proximate thereto in the direction of said containers travel; a third branch pipe having a valve therein being arranged in said pipeline upstream of and proximate to said first gate in the direction of the containers travel and communicating with the atmosphere; and a further branch pipe for gas discharge having a valve therein being connected at one of its ends to said pipeline portion upstream of and proximate to said second sluice gate and connected at its opposite end to said first branch pipe upstream of said first branch pipe valve in the direction of the containers travel thereby communicating said pipeline portion with said intermediate compressed gas flow source whereby the container is continuously passed through said pipeline portion.

2. An arrangement according to claim 1, wherein the further gas discharge branch pipe is connected to said pipeline portion at some distance from the first sluice gate, in the direction of the containers travel, that exceeds the length of the free path of a container.

* * * * *